United States Patent [19]

Lawson

[11] Patent Number: 4,700,661
[45] Date of Patent: Oct. 20, 1987

[54] SWINE FARROWING SYSTEM

[76] Inventor: John D. Lawson, R.R. 1, Box 83, Leesburg, Ind. 46538

[21] Appl. No.: 788,794

[22] Filed: Oct. 18, 1985

[51] Int. Cl.4 ................................................. A01K 1/02
[52] U.S. Cl. ....................................................... 119/20
[58] Field of Search .............................. 119/16, 20, 27

[56] References Cited

U.S. PATENT DOCUMENTS

| | | | |
|---|---|---|---|
| 1,230,237 | 6/1917 | Sturm | 119/16 |
| 2,602,419 | 7/1952 | Johnson | 119/16 |
| 3,181,503 | 5/1965 | Tripp | 119/20 |
| 3,472,206 | 10/1969 | Hegland | 119/20 |
| 4,006,715 | 2/1977 | Redmon et al. | 119/20 |
| 4,351,272 | 9/1982 | McDonald | 119/20 |

Primary Examiner—Robert P. Swiatek
Attorney, Agent, or Firm—Roger M. Rickert

[57] ABSTRACT

A one sided creep area farrowing crate fabricated principally from flat material, sheet metal, plastic, wood, etc., has a molded sow pen entrance door with integral rump guard and a longitudinal sheet metal barrier separating the sow pen from the litter creep area while allowing nursing due to the elevation of the sheet metal barrier above the floor surface. Adjacent pairs of farrowing crates may be arranged back to back so as to share a common sow pen wall. With this arrangement a significant floor space reduction is achieved and the mother sow is forced to lie always on the same one side when nursing. Other floor plans may accomplish the same space saving features with this one side creep area, such as the single sow system described herein, or the linear row (side exit) system.

14 Claims, 5 Drawing Figures

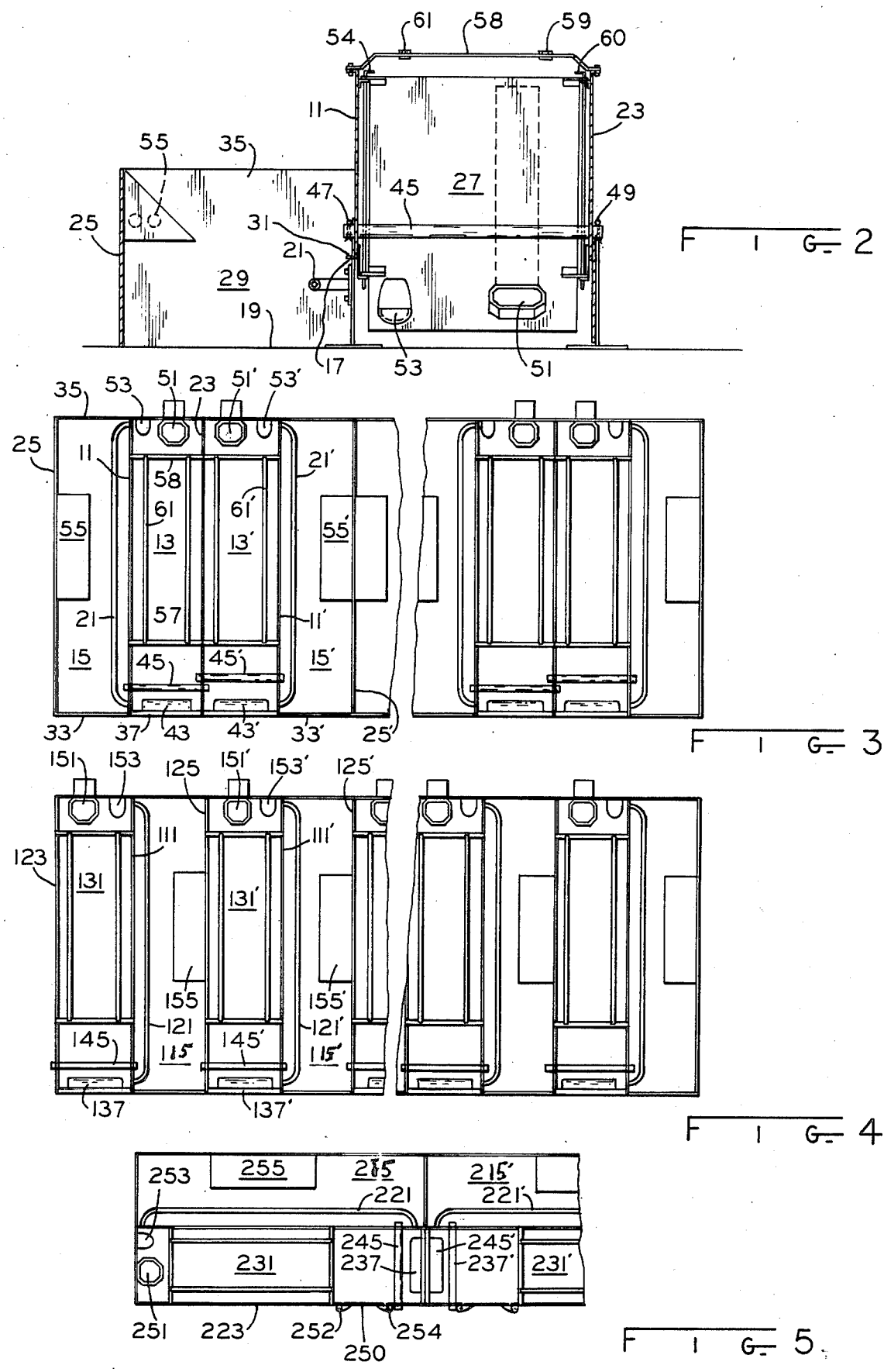

SWINE FARROWING SYSTEM

BACKGROUND OF THE INVENTION

The present invention relates generally to animal husbandry techniques and more especially to such techniques for farrowing pigs from the time of their birth until weaning is completed. In particular a farrowing crate where a litter of young pigs may nurse to a preferred single side only of a mother sow and fabricated substantially from flat sheet metal is employed in practicing the present inventive techniques.

Swine management is a relatively sophisticated art which typically includes among other items the use of so-called farrowing crates or stalls which are formed as a cage-like structure of steel tubing having a center sow confining pen and a generally rectangular creep area where young pigs can escape being smothered or injured by the mother sow and with relatively short nursing access regions, one on either side of the sow pen so that the mother sow may lie on either side while nursing a litter. Young pigs try to return to the same nipple at each feeding and due to the mother sow lying on one side and then the other such young pigs sometimes become disoriented as to precisely where they should be at feeding time. This same shifting from one side to the other on the part of the mother sow at the time of birth not only creates a measure of disorientation for the newborn pig but also may create placenta or unbilical cord entanglement problems and potential for infant mortality.

Another only recently recognized problem is that the hollow steel tubing from which such farrowing crates are fabricated are damaged and ultimately ruined by rust, frequently from the inside of the tube outwardly much the same as an automobile body rusts through due to exposure to moisture and salt of the undersurfaces of that automobile body. At least two manufacturers have recently introduced farrowing crates employing solid rods rather than hollow tubing in an attempt to alleviate this problem.

The floor space consumed in a pork producing operation translates into a nearly fixed expense in the form of initial cost, maintenance, lighting, heating, ventilating and the like, substantially independent of the number of litters being weaned in a given facility. It would be highly desirable to reduce the floor space required for each litter thus increasing the number of litters being weaned in a given facility.

Among the several objects of the present invention may be noted the reduction in floor space required for weaning a litter of pigs; the provision of a farrowing crate fabricated substantially from a flat sheet metal with the dual corrosion protection of galvanizing and baked on epoxy coatings; the provision of a process of farrowing pigs wherein a mother sow is encouraged to lie generally on her same one side when nursing; the provision of a farrowing crate design wherein one sidewall thereof functions simultaneously as one wall of a sow pen in each of two adjacent farrowing crates; and the provision of a farrowing crate of reduced initial cost, reduced floor space and of a design yielding an enhanced litter survival rate.

In general, a farrowing crate of primarily flat sheet metal construction has a generally rectangular floor area with a vertical sheet metal barrier extending longitudinally to separate that floor area into two smaller rectangular areas, one for a sow pen and the other as a creep region where young pigs are protected from smothering or other injury by a mother sow.

Also in general and in one form of the invention, a swine management practice includes the confining of a mother sow in a pen having an entry way at one end, and water and feed sources at the other along with the provision of a creep area for a litter of young pigs along one side only of the pen whereby the mother sow is encouraged to lie generally on the same side when nursing the litter. The sow may, however, comfortably lay on either side at her discretion.

Further in general and in one form of the invention, a farrowing crate has a pair of opposed upstanding sidewalls and a pair of opposed upstanding end walls defining a sow pen. A vertically slidable two sided molded sow access door may form substantially the entirety of one end wall with that access door being formed in one piece having an integral inwardly extending protrusion which, when the door is in its lowered position ensures a clearance space therebeneath for young pigs between a sow within the sow pen and the door. One of the sidewalls extends substantially to the bottom of the crate while the other terminates with a lower horizontal edge elevated above the bottom of the crate creating a nursing gap allowing young pigs access to a mother sow from a region adjacent the other sidewall.

BRIEF DESCRIPTION OF THE DRAWINGS

FIG. 2 is an end view in cross-section along line 2—2 of the farrowing crate of FIG. 1;

FIG. 3 is a plan view illustrating several farrowing crates adjacent pairs of which share a common sidewall;

FIG. 4 is a plan view similar to FIG. 3 but illustrating a different arrangement for the several farrowing crates; and FIG. 5 is a plan view similar to FIGS. 3 and 4 but illustrating a linear row and isle arrangement where the access door of each farrowing crate has been moved from the end to the side.

Corresponding reference characters indicate corresponding parts throughout the several views of the drawing.

Figure 1:
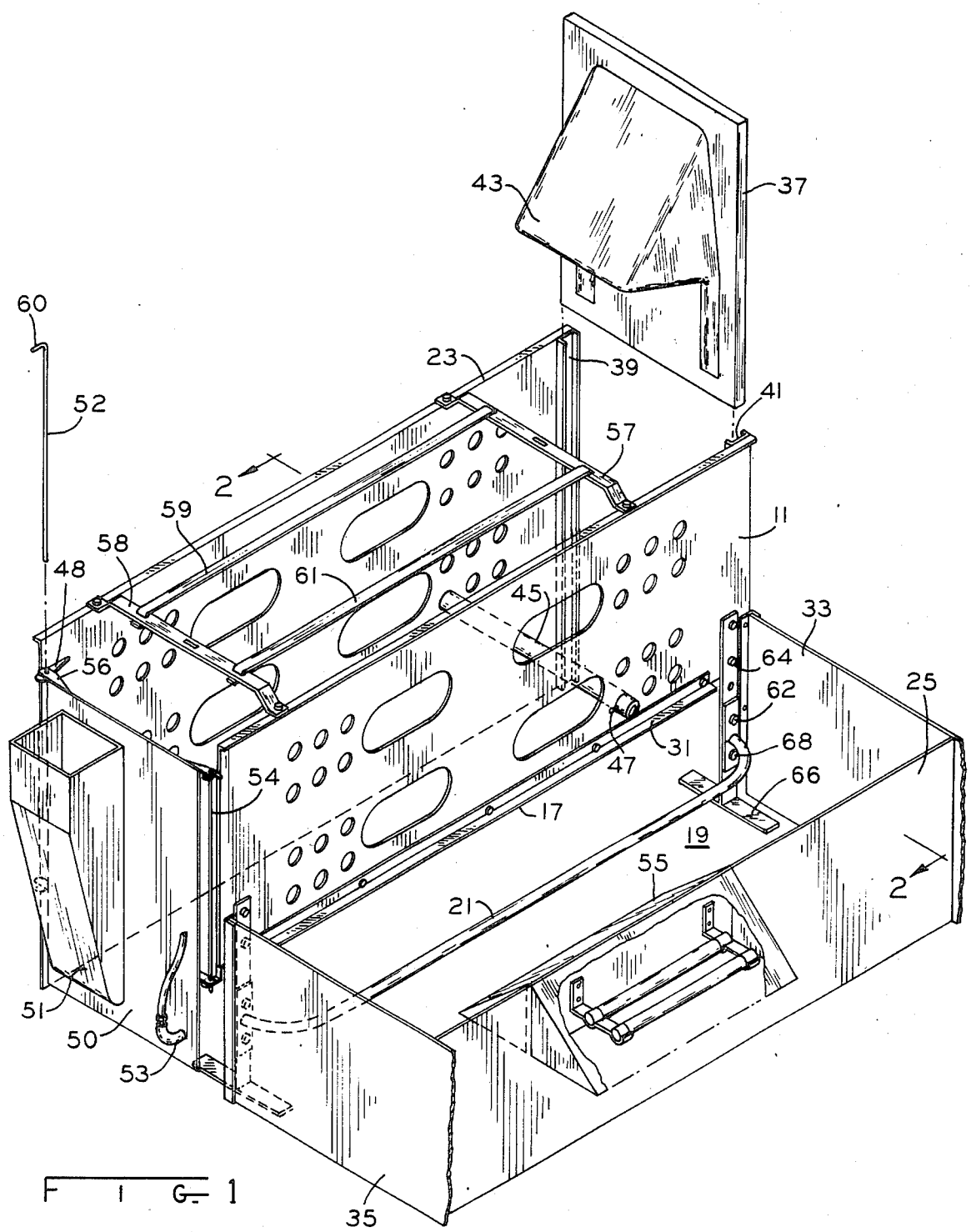
FIG. 1 is a perspective view of a farrowing crate illustrating the invention in one form.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawings generally, the farrowing crate is seen to have a generally rectangular horizontal floor area with a vertical sheet metal barrier 11 extending longitudinally to separate the floor area into two smaller generally rectangular areas, one defining a sow pen floor 13 and the other defining a creep region 15 where a litter of pigs are protected from smothering or other injury by a mother sow in the pen 13. The barrier 11 has a generally horizontal bottom edge 17 which is elevated above the floor 19 providing a nursing gap therebetween. The nursing gap may be further defined by a horizontally extending bowed rail 21 adjustably positionable below and laterally displaced from the barrier in a direction toward the creep region. Thus in FIG. 2 the sow pen is designated generally as 27 while the creep region is generally designated as 29. An angle bracket 31 may be fastened along the lower edge of sheet metal barrier 11 for enhanced rigidity if desired.

The farrowing crate further includes a plurality of sidewalls such as 23, 25, 33 and 35, which extend upwardly around the periphery of the floor area and with two of those sidewalls 23 and 25 extending generally parallel to the barrier 11 and defining the respective lateral outer sides of the sow pen 27 and creep region 29 respectively.

Sidewall 33 includes a vertically slidable sow access door 37 which may, as illustrated in FIG. 1, be raised along U-shaped tracks 39 and 41 to allow a sow to enter or leave the sow pen 27 and lowered to confine a sow within that sow pen. The two sided sow access door 37 may be a one piece molded plastic door having an integral inwardly extending protrusion 43 sometimes referred to as a "rump guard" which when the door is lowered ensures the clearance space beneath protrusion 43 for the young pigs between a sow within the sow pen and the door 37. Additionally, door 37 may be foam filled for increased strength. An additional rump guard may be provided in the form of steel bar 45 extending between adjustably selected pairs of apertures in the sidewalls 11 and 23 and secured therein by substantially flaring one end of the tubular rump guard and quick release snap pins such as 47 and 49.

At the end of the sow pen opposite the closable entry way formed by the door 37 are conventional feed 51 and water 53 sources with water source 53 being to the side of the feed source 51 nearer the creep area to allow young pigs access thereto. The creep area is typically provided with auxiliary or supplementary heating such as a series of infrared heat lamps 55 or heat mats on the floor.

With the one sided creep area configuration it is possible to form a pair of adjacent farrowing crates with one the mirror image of the other as indicated by the primed and unprimed reference numerals in FIG. 3. With this configuration two adjacent farrowing crates may share a common outer sow pen sidewall 23 if desired.

As a top cover for the sow pen and to add enhanced rigidity to the sheet metal sidewalls, a pair of lateral braces such as 57 and 58, and a pair of longitudinal braces 59 and 61 are illustrated. However, a more nearly solid roof of apertured sheet metal much like the sidewalls could be provided. With a standard floor plan for conventional two sided creep area farrowing crates, the sow pen is typically twenty-four inches wide with laterally adjacent creep areas eighteen inches each in width. With the one sided configuration illustrated herein, a sow pen of twenty-three inches in width and a creep area twenty-five inches in width may be provided with an overall reduction in the width of the farrowing crate of twelve inches which represents a twenty percent reduction in floor space requirement or equivalently allows a twenty percent increase in the number of farrowing crates in a given installation. Crate length remains about the same, typically around seventy-eight inches. However, crates of 18"- 20"- 22"24" may be utilized by this invention with creep areas of 18" up to 25" at the producer's discretion. A combination of minor dimensions of crate width and creep area allows for the possibility of up to 40% floor space reduction.

Early test results with control sows in conventional farrowing crates showed 8.4 pigs weaned in the conventional crates while 8.6 pigs were weaned per sow in the one sided crates of the present invention. Subsequent farrowings have produced 9.6 pigs weaned in these crates while 8.4 pigs were weaned in conventional crates of the control group. This improvement apparently flows from the technique of the present invention wherein a creep area for the litter is provided along one side only of the pen confining the mother sow so as to encourage that mother sow to generally lie on her same one side when nursing the litter.

The floor plan of FIG. 3 yields certain economies such as the sharing of a common wall 23 between two adjacent sow confinement regions. In essence this floor plan or arrangement is a sow, sow, creep area, creep area sow, sow, etc. arrangement and thus adjacent farrowing crates are the mirrow image of one another. Other floor plans may be better suited to certain installations and two further examples are illustrated in FIGS. 4 and 5.

In FIG. 4 adjacent farrowing crates are substantially identical with reference numerals identifying previously discussed components being 100 greater. Thus a nursing panel or foreshortened partition 111 and a bowed nursing rail 121 function to separate creep area 115 from the sow confinement region 131. Feed 151 and water 153 supplies are provided at one end of the sow confinement area while vertically sliding door 137 and rump guard bar 145 are provided at the other end of the sow confinement region. In this configuration a full divider panel 123 is used on each farrowing crate.

In FIG. 5 a 200 series of reference numerals is employed to identify previously discussed componets. In the floor plan of FIG. 5, the farrowing crates are arranged in an end to end arrangement with an aisle along the sides rather than along one or both ends as in FIGS. 3 and 4. With this end to end arrangement sow access to the confinement area 231 from the crate ends is essentially blocked and the full divider panel 223 is provided with an access door 250 suspended on removable hinge pins 252 and 254, either of which may be removed to swing door 250 on the other allowing the sow to enter the confinement area. Hinge pins 252 and 254 are analagous to similar hinge pins 52 and 54 in FIG. 1 where their detailed structure is more discernible.

Returning to FIG. 1, end door 50 has tabs, such as 56, aligned with similar tabs 48 on each of the side panels and with the apertures of the tabs such as 56 and 48 in vertical alignment to receive an elongated pin 52. Pin 52 has a bent over end 60 which rests on the upper surface of tab 56 when pin 52 is in place holding door 50 in its closed position. Either of the pins 60 or 54 may be removed allowing door 50 to pivot about the other of those pins. Thus, a sow might enter the crate of FIG. 1 through sliding door 37 and later leave that crate through hinged door 50 thus obviating the problem of trying to get the sow to back out of the crate.

The other structural details of the crate should be apparent from the drawings themselves. For example, the bowed nursing rail 21 may be made vertically adjustable by the attachment bolts such as 62 and 64, one of which as illustrated fastens the end of the nursing rail 21 to the vertical portion of support leg 66 as well as to the nursing panel 11. To change the elevation of the bowed nursing rail 21, bolts 62, 64 and 68 and corresponding bolts at the other end of the rail would be removed and rail 21 fastened by a different pair of such bolts at a different elevation. From the foregoing it is now apparent that a novel method and apparatus for swine management has been disclosed meeting the objects and advantageous features set out hereinbefore as well as others and that modifications as to the precise configuration, shapes and details may be made by those having ordinary skill in the art without parting from the spirit of the invention or the scope thereof as set out by the claims which follow.

What is claimed is:

1. A farrowing crate fabricated substantially from flat sheet material having a generally rectangular horizontal floor area and a generally vertical barrier extending longitudinally to separate the floor area into two smaller generally rectangular areas, one defining a sow pen floor and the other defining a creep region where young pigs are generally protected from injury by a mother sow, the crate including a plurality of side walls extending upwardly from the floor area periphery, two of which extend generally parallel to the barrier to define the respective lateral outer sides of the creep region and a sow pen, the one of said two sidewalls defining the outer side of the sow pen also forming an outer sow pen sidewall for an adjacent farrowing crate.

2. The farrowing crate of claim 1 wherein the barrier has a generally horizontal edge elevated above the floor area defining therebetween a nursing gap which allows access to a mother sow by young pigs in the creep region for one side nursing.

3. The farrowing crate of claim 2 further comprising a horizontally extending bowed rail located at an adjustably selectable position below and laterally displaced from the barrier toward the creep region side thereof.

4. The farrowing crate of claim 2 further comprising a horizontally elongated reinforcing bar generally coextensive with the barrier bottom edge.

5. The farrowing crate of claim 1 wherein the other of said two sidewalls is provided with an auxiliary heat source for elevating the temperature of a portion of the creep region.

6. The farrowing crate of claim 1 wherein the one of said two sidewalls defining the outer side of the sow pen extends downwardly substantially to the floor and provides the major longitudinal barrier for the creep area in a next adjacent farrowing crate.

7. The farrowing crate of claim 1 wherein another of said sidewalls distinct from the two sidewalls includes a vertically slidable sow access door which may be raised to allow a sow to enter or leave the sow pen and lowered to confine a sow within the sow pen.

8. The farrowing crate of claim 7 wherein the sow access door is a one piece molded plastic door having an integral inwardly extending protrusion which when the door is lowered insures a clearance space beneath the protrusion for young pigs between a sow within the sow pen and the door.

9. The farrowing crate of claim 8 wherein the sow access door is foam filled for increased strength and further comprising a second hinged door at the crate end opposite the access door, allowing sow movement out of the crate.

10. In a farrowing crate having a pair of opposed upstanding generally parallel sidewalls and a pair of opposed upstanding generally parallel end walls defining a sow pen, a vertically slidable sow access door forming substantially the entirety of one end wall which may be raised to allow a sow to enter or leave the sow pen and lowered to confine a sow within the sow pen, the access door being formed in one piece having an integral inwardly extending protrusion which when the door is lowered insures a clearance space beneath the protrusion for young pigs between a sow within the sow pen and the door, one of the sidewalls extending substantially to the bottom of the crate forming a sidewall for an adjacent farrowing crate while the other terminates along a generally horiziontal bottom edge elevated above the bottom of the crate creating a nursing gap which allows access to a mother sow by young pigs from a region adjacent the other sidewall.

11. The combination of claim 10 further comprising a horizontally elongated reinforcing bar generally coextensive with the other sidewall bottom edge.

12. The combination of claim 10 wherein said one sidewall forms a creep barrier for an adjacent farrowing crate.

13. In a farrowing crate having a pair of opposed upstanding generally parallel sidewalls and a pair of opposed upstanding generally parallel end walls defining a sow pen, the improvement wherein one of the sidewalls extends substantially to the bottom of the crate and forms a sidewall for an adjacent farrowing crate while the other terminates along a generally horizontal bottom edge elevated above the bottom of the crate creating a nursing gap which allows access to a mother sow by young pigs from a region adjacent the other sidewall.

14. The improvement of claim 13 further comprising a horizontallly elongated reinforcing bar generally coextensive with the other sidewall bottom edge.

* * * * *